United States Patent
Watanabe et al.

(10) Patent No.: US 8,856,700 B1
(45) Date of Patent: Oct. 7, 2014

(54) METHODS, SYSTEMS, AND APPARATUS FOR RELIABILITY SYNTHESIS

(75) Inventors: Yosinori Watanabe, El Cerrito, CA (US); Walter J. Ghijsen, San Jose, CA (US); Michael J. Meyer, Palo Alto, CA (US); Michael T. Y. McNamara, Los Gatos, CA (US); David Van Campenhout, San Jose, CA (US)

(73) Assignee: Cadence Design Systems, Inc., San Jose, CA (US)

(*) Notice: Subject to any disclaimer, the term of this patent is extended or adjusted under 35 U.S.C. 154(b) by 1310 days.

(21) Appl. No.: 12/047,540

(22) Filed: Mar. 13, 2008

Related U.S. Application Data

(60) Provisional application No. 60/895,440, filed on Mar. 17, 2007.

(51) Int. Cl.
 *G06F 17/50* (2006.01)

(52) U.S. Cl.
 USPC ............................................................ 716/101

(58) Field of Classification Search
 USPC ....................................... 716/1, 18, 100, 101
 See application file for complete search history.

(56) References Cited

U.S. PATENT DOCUMENTS

| | | | | |
|---|---|---|---|---|
| 6,812,731 B1* | 11/2004 | Trimberger | | 326/10 |
| 6,904,574 B1* | 6/2005 | Bloom | | 716/103 |
| 7,836,366 B2* | 11/2010 | Sharma et al. | | 714/726 |
| 8,185,812 B2* | 5/2012 | Das et al. | | 714/814 |
| 2002/0016705 A1* | 2/2002 | Kroell et al. | | 703/14 |
| 2002/0188892 A1* | 12/2002 | Lajolo | | 714/42 |
| 2003/0033595 A1* | 2/2003 | Takagi et al. | | 717/143 |
| 2003/0188272 A1* | 10/2003 | Korger et al. | | 716/4 |
| 2005/0281113 A1* | 12/2005 | Yada et al. | | 365/222 |
| 2007/0050740 A1* | 3/2007 | Jacobi et al. | | 716/5 |
| 2007/0162798 A1* | 7/2007 | Das et al. | | 714/724 |
| 2007/0226600 A1* | 9/2007 | Ogawa | | 714/798 |
| 2007/0234101 A1* | 10/2007 | Koktan et al. | | 714/2 |
| 2008/0111558 A1* | 5/2008 | Sharma et al. | | 324/537 |
| 2008/0126064 A1* | 5/2008 | Tseng et al. | | 703/14 |
| 2008/0189481 A1* | 8/2008 | Mayer et al. | | 711/111 |
| 2009/0031183 A1* | 1/2009 | Hoshino et al. | | 714/748 |
| 2009/0070654 A1* | 3/2009 | Flachs et al. | | 714/758 |
| 2011/0126051 A1* | 5/2011 | Flautner et al. | | 714/30 |

* cited by examiner

*Primary Examiner* — Suchin Parihar
(74) *Attorney, Agent, or Firm* — Alford Law Group, Inc.

(57) ABSTRACT

In one embodiment of the invention, a method of synthesizing a circuit design is disclosed including receiving an input model of an initial circuit design into an electronic design automation system; receiving a user specification detailing a reliability feature to add to the initial circuit design; adding the reliability feature to the input model based upon the user specification to generate a modified input model; and producing an output model of a circuit design with the reliability feature in response to the modified input model.

28 Claims, 9 Drawing Sheets

```
module design (input a1, a2, a3;
        output state;
        input clk, reset);

reg [3:0] state, next_state;

always begin
            case(state)
        4'b0001:
            if (a1) next_state = 4'b0010;
            else next_state = 4'b1000;
        4'b0010:
            next_state = 4'b0100;
        4'b0100:
            if ((a2|a3)&!a1) next_state = 4'b0001;
            else if (!a2) next_state = 4'b0010;
            else if (!a3) next_state = 4'b0100;
            else next_state = 4'b1000;
        4'b1000:
            if (a3) next_state = 4'b0001;
            else next_state = 4'b0100;
            endcase // case (state)
        end // always begin always @(clk)
            if (reset) state = 4'b0001;
            else state = next_state;

endmodule // design
```

```
module design (input a1, a2, a3;
               output reg [3:0] state;
               output reg error;
               input clk, reset);

reg [3:0] next_state;

always begin
    if (^state) begin
        error = 1'b0;
            else // ERROR DETECTED!!
        state = 4'b0001;
            error = 1'b1;
            end
        case(state)
    4'b0001:
        if (a1) next_state = 4'b0010;
        else next_state = 4'b1000;
    4'b0010:
        next_state = 4'b0100;
    4'b0100:
        if ((a2|a3)&!a1) next_state = 4'b0001;
        else if (!a2) next_state = 4'b0010;
        else if (!a3) next_state = 4'b0100;
        else next_state = 4'b1000;
    4'b1000:
        if (a3) next_state = 4'b0001;
        else next_state = 4'b0100;
        endcase // case (state)
    end // always begin always @(clk)
        if (reset) begin
            state = 4'b0001;
            error = 1'b0;
        else state = next_state;

endmodule // design
```

```
module design (input a1, a2, a3;
        output reg [3:0] state;
        output reg error;
        input clk, reset);

reg [3:0] next_state;

always begin
            error = 1'b0; // clear error indicator
            case(state)
        4'b0001:
            if (a1) next_state = 4'b0010;
            else next_state = 4'b1000;
        4'b0010:
            next_state = 4'b0100;
        4'b0100:
            if ((a2|a3)&!a1) next_state = 4'b0001;
            else if (!a2) next_state = 4'b0010;
            else if (!a3) next_state = 4'b0100;
            else next_state = 4'b1000;
        4'b1000:
            if (a3) next_state = 4'b0001;
            else next_state = 4'b0100;
              default:
              error = 1'b1;
                 next_state =4'b0001;
              endcase // case (state)
        end // always begin always @(clk)
            if (reset) begin
                state = 4'b0001;
                error = 1'b0;
            else state = next_state;

endmodule // design
```

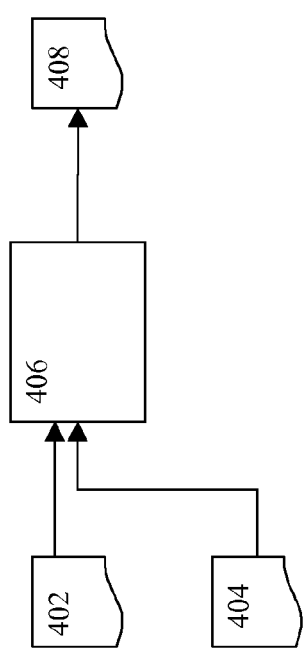

US 8,856,700 B1

METHODS, SYSTEMS, AND APPARATUS FOR RELIABILITY SYNTHESIS

CROSS REFERENCE TO RELATED APPLICATIONS

The non-provisional U.S. patent application claims the benefit of U.S. Provisional Patent Application No. 60/895,440 entitled "SYSTEM AND METHOD FOR RELIABILITY SYNTHESIS" filed on Mar. 17, 2007 by Yosinori Watanabe et al., which is expressly incorporated herein by this reference in its entirety.

FIELD OF THE INVENTION

The embodiments of the invention relate to computer automated design of electronic circuits and systems. The embodiments of the invention further relate to synthesis of multiple implementations of a design each with different provisions of circuitry for reliability assurance.

BACKGROUND

Modern circuit design has given rise to a specialized field often referred to as electronic design automation in which computers and computer aided design (CAD) techniques are used to automate the integrated circuit (IC) design process. An IC design process typically begins with an engineer specifying the input/output signals, functionality and performance characteristics of a hardware circuit to be fabricated. These characteristics may be captured in a high level hardware description language (HDL) model, which represents a circuit design at a higher level of abstraction, thereby reducing the number of individual design objects that a designer needs to consider individually by perhaps orders of magnitude.

The continuous advances in integrated circuit device manufacturing technology allow building smaller and more complex devices from transistors that are smaller in size, and, thus, more susceptible to defects, both permanent and intermittent. The reduction of cost for the device, per transistor, enable the creation of increasingly complex distributed systems made of many interacting devices. Examples include the cellular telephone system and the deployment of global positioning system (GPS) devices in automobiles for navigation. This paired challenge of building complex interacting systems of heterogeneous devices (cell phones) from components that may be unreliable (extremely small transistors) is a new and expanding challenge.

SUMMARY OF THE INVENTION

The embodiments of the invention are summarized by the claims that follow below.

BRIEF DESCRIPTION OF THE DRAWINGS

In order to gain an understanding of the embodiments of the invention, reference is made in the detailed description to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates one embodiment of a set of code for a base state machine without any reliability features.

FIG. 2 illustrates one embodiment of a set of code for a base state machine with detection of single bit errors.

FIG. 3 illustrates one embodiment of a set of code for a base state machine with detection of multi-bit errors.

FIG. 4 is an illustrative flow diagram of a reliability synthesis process in accordance with an embodiment of the invention.

DETAILED DESCRIPTION

Figure 5:
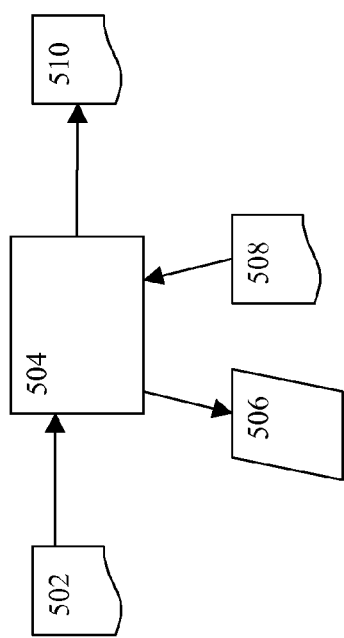
FIG. 5 is an illustrative flow diagram of a reliability synthesis process that includes user input.

Additional features of the embodiments of the invention are set forth in the description which follows, and in part may be obvious from the description, or may be learned by practice of the embodiments of the invention. The features of embodiments of the invention may be realized and obtained by means of the instruments and combinations particularly pointed out in the appended claims. These and other features of the embodiments of the invention will become more fully apparent from the following description and appended claims, or may be learned by the practice of the embodiments of the invention as set forth herein.

Various embodiments of the invention are discussed in detail below. While specific implementations are discussed, it should be understood that this is done for illustration purposes only. After reading this disclosure, one may recognize that other components and configurations may be used without parting from the spirit and scope of the embodiments of the invention.

Methods, systems, and apparatus of electronic design automation (EDA) for automatically synthesizing a circuit design are generally disclosed. Generally in some embodiments of the invention, an input model is a high level description of an initial circuit design. An input interface may receive the input model and a user specification detailing reliability features. A processor may add the reliability features to the input model based upon the user specification. An output interface may present an output model of a circuit with reliability features. The output model is a netlist. The netlist maps and interconnects circuit cells from a cell library to perform the function of the circuit design and the function of the added reliability features.

High Level Synthesis (HLS) can be defined broadly as a translation process from a behavioral description of a circuit design written in a programming language intended to run on a microprocessor to a structural description of the circuit design coded in a hardware description language (HDL), sufficient for implementation of the design as an integrated circuit. A structural representation typically comprises a one-to-many mapping of a behavioral representation onto a set of components in accordance with design constraints such as cost, area, delay and power consumption. Each component in a structural design, in turn may be defined by its own behavioral description. Thus, a circuit design can be represented behaviorally at many different levels of abstraction, and different software-based synthesis tools typically are used depending upon the level of abstraction at which a circuit design is specified.

When planning the design of a device, such as an integrated circuit, a developer may target the implementations to serve different markets having differing requirements for reliability. When an integrated circuit is to be part of a system which is intended to serve in the medical area, in a large corporate data center, or in the operation of an airplane or automobile, the requirements for accurate calculation and reliable communication of the data are much higher than if the device is intended to be used in a greeting card or low end consumer electronic device. Traditional methods required designers to include specific logic descriptions as needed to employ high reliability features in a device designed for such an application, and to withhold these descriptions when designing for the low-end market. Moreover, designers were required to alter other aspects of the device to accommodate the additional logic's addition or removal.

Examples of high reliability features include incorporating parity bits in data paths and storage elements to allow detection of errors and hence allow the receiver to request retransmission; incorporating error correction codes (ECC) in data paths and storage elements to enable the repair of data that has arrived damaged by the receiver; incorporating error detection and self recovery in the implementation of state machines; and incorporating fault isolation registers (FIR) to enable higher level systems to select between redundant systems for a configuration that will continue to deliver service; and to determine which of the many components of the system has the failure, and which are merely propagating errors from other components.

Parity is the incorporation of an additional bit in a data path, for example expanding an 8-bit path to become a 9 bit path, where the extra bit holds the parity of the 8 bits. In this example, a bus with even parity would set the $9^{th}$ bit to 1 if the number of ones in the eight bits is odd (making the total number of ones even). A bus with odd parity would set the $9^{th}$ bit to 1 if the number of ones in the eight bits is even (making the total number of ones odd). Introducing parity into a circuit design requires insertion of additional logic to calculate the extra parity bit at each source of data, provision of the extra wire to carry the parity bit to the destination, and insertion of logic to validate that the parity in the data bits matches the value of the parity bit, as well as provision of a signal to indicate when the parity is incorrect.

ECC is the incorporation of additional bits in the data path, for example expanding an 8-bit path to a 13-bit path, and an encoding so that any single bit error in a word can be fixed, and a double bit error would be detected. Even more protection can be delivered by expanding the correction code across multiple words, using coding techniques such as Reed-Solomon or Turbo. With these techniques absolute perfection of transmission can be assured given an error rate less than an arbitrary amount. The cost is the additional hardware at the transmitter and the receiver, as well as the additional signal bits required in the data path, or the additional time to send the extra information down a data path that remains the original width.

Integrated circuit designers use the state machine to represent and implement the decision process performed by a device. The current state of a device is the value of the many bits of information that represent the current situation: the car is in first gear; the lights are on; the accelerator is depressed 20%; the windshield wipers are running in slow speed. The input to a device is the value of the many requests from the outside world: the user moves the wiper switch to the fast speed position. The state machine calculates the next state value based on the current state value and the inputs to the circuit design: switch the wipers to high speed.

Nearly all-state machines have the ability to represent states that cannot occur, or should not occur. For example of the first, a car's transmission cannot be in the reverse gear and in a forward gear at the same time. An example of the second is that the system should not allow the transmission to be placed in the reverse gear when the car is moving forward with any speed.

A machine may reach an illegal state in several ways: 1) input data to the machine could be incorrect—the sensors for "in fifth gear" and "in reverse gear" could have their wires crossed so our device sees as inputs that both of these conditions are true; 2) an intermittent or permanent failure of the circuitry implementing our device could show that both of these conditions are true, even though in reality only one is true; 3) a catastrophic failure of the transmission may occur such that indeed both conditions are true and likely the car is also wrapped around a tree.

A circuit designed without consideration to the possibility of occurrence of an illegal state will behave illogically if one occurs—with potentially disastrous effect. Systems designed in a fault tolerant manner will detect illegal states, and indicate errors to a FIR so that higher-level systems can then take appropriate actions such as disabling the device and substituting an alternate component, or gracefully shutting down the entire system.

A state machine can be built to implement different levels of error detection, depending on the reliability requirements. FIG. 1 illustrates one embodiment of a set of code 100 for a base state machine without any reliability features. In a state machine with a one-hot state vector (one and only one state bit is ever set at a particular time), detection of single-bit errors can be added by performing an XNOR of all the state bits, as shown in FIG. 2. For higher reliability, multi-bit errors can be detected by adding a default statement to the case statement, as shown in FIG. 3.

FIG. 4 is an illustrative flow diagram of a reliability synthesis process 400 in accordance with an embodiment of the invention. An input model 402 of an initial circuit design plus associated reliability specifications 404 are input to a software-based synthesis tool 406. The tool 406 identifies each element of the input model 402 which requires enhancement in order to implement the reliability specifications 404 (such as identifying state machines, busses and memories), and translates the input model 402 into an output model 408 that incorporates the reliability specifications 404 as features of the output model 408.

In another embodiment 500, as shown in the example of FIG. 5, the input file 502 is input into the EDA tool 504. As the EDA tool 504 processes the input file 502, it examines each element of the input. Design elements include storage elements, computing elements and communication elements. The tool presents the list of design elements to the user as data 506 perhaps in a graphical form, in a textual list, or by other means, and then accepts a selection 508 from the user as to what reliability features (if any) to include in the implementation of each element of the input design. Prior to mapping the input file 502 to a technology file including standard circuit cells, the functional description of the circuits in the input file 502 will be modified and/or altered to include additional code by the tool to in order to add the reliability features to the design elements. Then the tool 504 maps the function description of the modified input file with its reliability features to generate the output model 510, such as a netlist for example, which includes the required reliability features as specified in reliability specification 508. The output model 510 may then be stored into a database, such as an integrated circuit (IC) design database, on a storage device.

Figure 6:
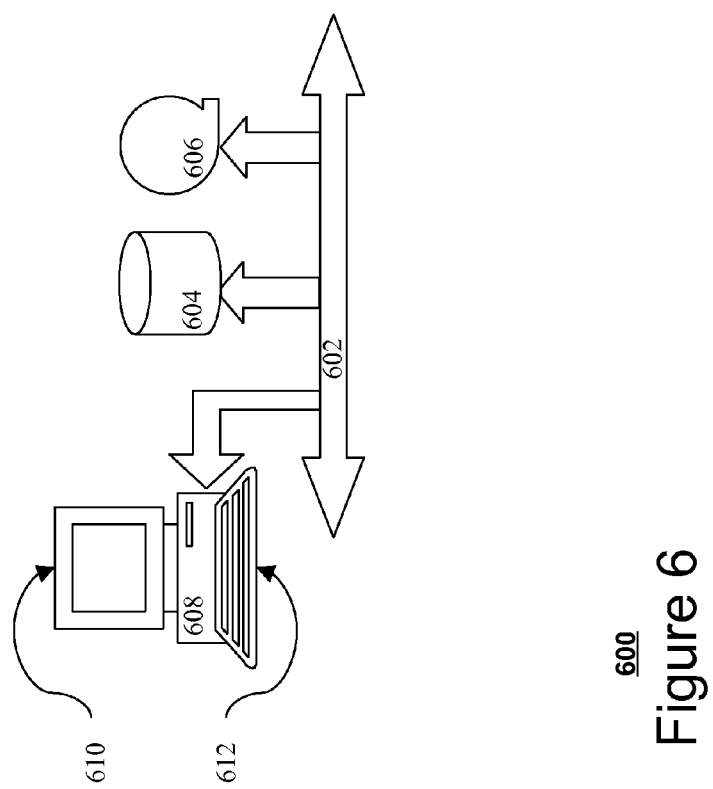
FIG. 6 illustrates in a block diagram a system for processing the input file to generate an output file.

FIG. 6 illustrates in a block diagram a system 600 for processing the input file. The input file 402 and reliability specifications 404 may be provided via bus 602, from storage 604 or other devices 606, to the synthesis tool running from storage 604 on the CPU 608. The tool translates the input specification, according to the reliability constraints into an output model that it stores via bus 602 to storage 604 or other devices 606.

Alternatively, input model 502 may be provided via bus 602, from storage 604 or other devices 606 to the synthesis tool running from storage 604 on CPU 608. The user is then presented with a list of design elements 604 on the display screen 610, and the user then inputs their reliability specifications 504 via an input device 612 or by other means.

Figure 7:
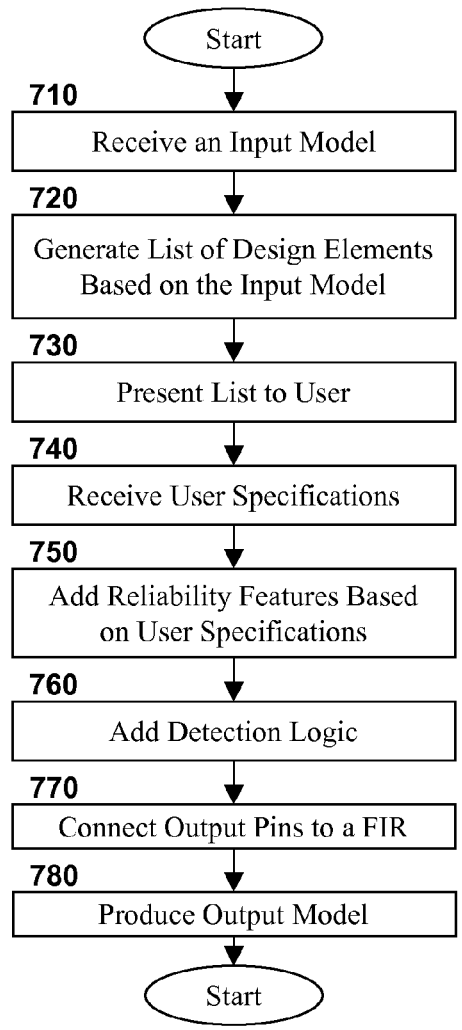
FIG. 7 illustrates in a flowchart one embodiment of a method for synthesizing reliability features using an electronic design automation tool.

FIG. 7 illustrates in a flowchart one embodiment of a method 700 for synthesizing reliability features using an EDA tool. The EDA tool may receive an input model describing a hardware circuit or other electronic device to be designed (Block 710). The EDA tool generates a list of design elements based on the design described in the input model (Block 720). The EDA tool presents the list to the user (Block 730). The EDA tool may receive a user specification for the reliability features from the user based on the list of design elements (Block 740). The EDA tool may alternately receive a user specification file from the user or read previously stored specification file stored on the system for the type of input model described. The reliability description may be general in form or specific in form. For example, a general reliability description may be to incorporate even parity on all communication elements and storage elements in the design A specific reliability description may be to incorporate ECC protection only on the communication path between the central unit and the remote sensor, for example. User specification in this usage may refer to a user specification data file, direct input from the user, or other methods for the user to convey the user's choice of reliability features. The EDA tool may add reliability features based on the user specification (Block 750). For instance, the EDA tool may automatically apply the parity reliability feature, ECC, or other reliability features for one or more design elements. The EDA tool may add detection logic to detect an illegal state and reset the state machine (Block 760). The detection logic added by the EDA tool may detect all single bit or multi-bit errors. The EDA tool may determine from the user specification that one or more output pins of the one or more inserted reliability features indicating success or failure be connected to a FIR, output, or other method for communication of the success or failure to other devices (Block 770). The EDA tool may determine from the user specification that one or more input pins must be created to accept error conditions of external inputs to the device, or that extra parity or ECC bits must be added to input and output busses of the device. The EDA tool may produce an output model of a circuit with reliability features incorporated (Block 780).

Figure 8:
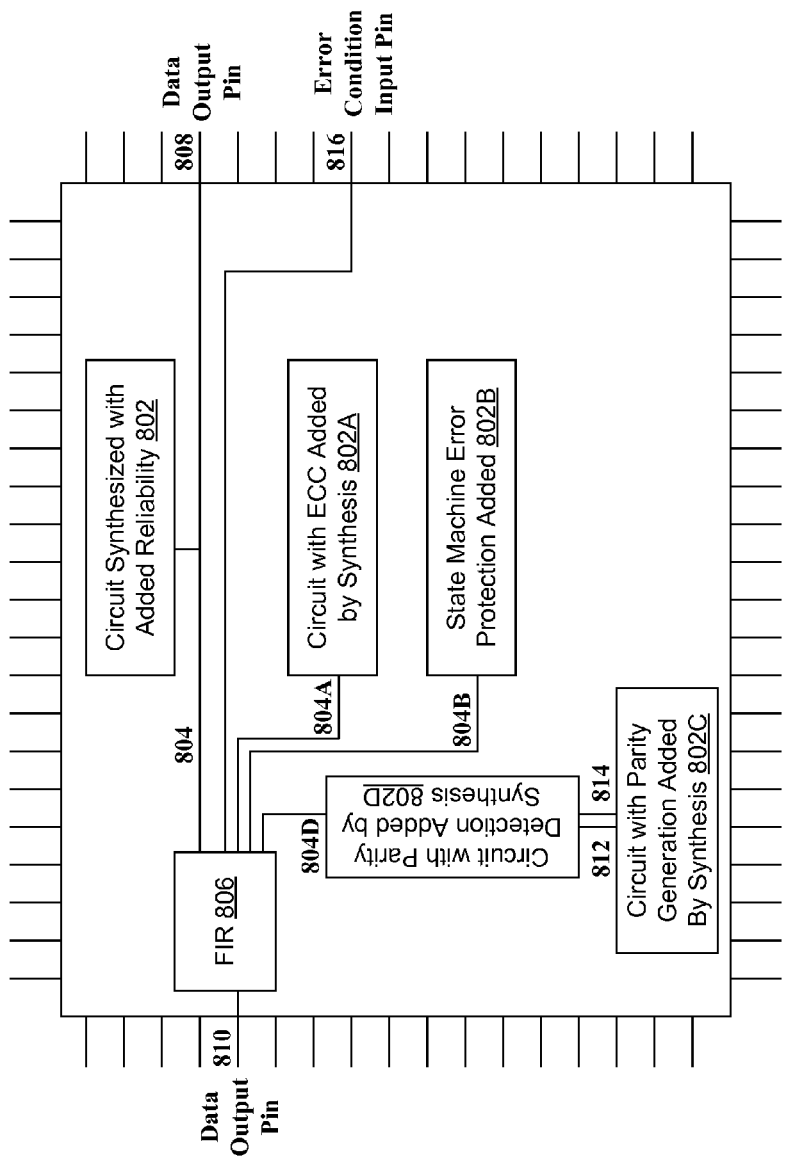
FIG. 8 illustrates a block diagram of an integrated circuit including circuits synthesized with added reliability features.

Referring now to FIG. 8, a block diagram of an integrated circuit 800 is illustrated. On a monolithic semiconductor substrate, the integrated circuit 800 includes one or more circuits 802 synthesized with added reliability circuitry added by a software synthesis electronic computer aided design (ECAD) tool. The integrated circuit 800 may further include fault output traces 804 routed on the substrate and coupled to the one or more circuits 802 to indicate fault or no-fault in the circuit 802. In one embodiment of the invention, the fault output trace 804 may be coupled to a fault output pin 808 of the integrated circuit to directly indicate a fault in the circuit to a different integrated circuit coupled to the pin 808. In another embodiment of the invention, the output trace 804 may instead or additionally be coupled to a FIR 806 of the integrated circuit 800. The FIR 806 may be coupled to one or more data output pins 810 to read out the status of the faults of the one or more circuits 802 to another integrated circuit. In another embodiment of the invention, the FIR 806 may be coupled to one or more input pins 816 to accept and aggregate error conditions from another integrated circuit into the FIR 806 for uniform presentation of the information to an external system. A separate integrated circuit coupled to the IC 800, such as a host processor for example, may read out the one or more bits in the FIR 806 to understand the fault status of the one or more circuits 802, and potentially the status of other devices connected via the one or more error condition input pins 816.

One circuit 802A in the integrated circuit 800 may include an added error correction code circuitry added by the software synthesis tool during logic synthesis of the integrated circuit design. The error correction code circuitry may not only detect a fault but may also correct a fault if it is detected. A fault output trace 804A of the circuit 802A may be coupled to the FIR 806. Alternatively or additionally, the fault output trace 804A may be coupled to an output pin of the integrated circuit 800.

Another circuit 802B in the integrated circuit 800 is a state machine with an error detection circuit or an illegal state detection circuit added by the software synthesis tool during logic synthesis of the integrated circuit design. The error detection circuit detects one or more bit errors in the states of the state machine. The illegal state detection circuit detects an illegal state of the state machine. A fault output trace 804B of the circuit 802B may be coupled to the FIR 806. Alternatively or additionally, the fault output trace 804B may be coupled to an output pin of the integrated circuit 800.

Another circuit 802C in the integrated circuit 800 includes a data bus 812 of parallel bits routed to a circuit 802D in the integrated circuit 800. The circuit 802C includes a parity generation circuit to include a parity bit 814 with the bus 812 of parallel data bits for detection of a parity error. The parity generation circuit was added to the circuit 802C during logic synthesis by a software synthesis ECAD tool. The circuit 802D includes a parity detection circuit to analyze the parity bit 814 with the parallel data bits of the bus 812 to detect a parity error. The parity detection circuit was added to the circuit 802D during logic synthesis by a software synthesis ECAD tool. A fault output trace 804D of the circuit 802D may be coupled to the FIR 806. Alternatively or additionally, the fault output trace 804D may be coupled to an output pin of the integrated circuit 800.

The one or more circuits 802 may be redundant circuits to that of circuits 802A-802D to increase the overall reliability of the integrated circuit so that it may continue to process data in case of a fault in one circuit. The FIR 806 may enable selection between redundant circuits in response to detecting a fault in one of the circuits. The FIR 806 may make the selection to a more reliable circuit from a faulty circuit. Alternatively, an external host processor may communicate with the FIR 806 in the integrated circuit to make the selection to a more reliable circuit.

In another embodiment of the invention, the one or more circuits 802 may complement a circuit in the integrated circuit. For example, circuit 802A includes error correction code circuitry added by the logic synthesis process. Error correction code circuitry may include an error correction encoder circuit to generate encoded data for transmission to another circuit, an error correction decoder circuit to detect and correct a fault in the received encoded data, or both. The one or more circuits 802 may also include error correction code circuitry to complement that of the circuit 802A so that they may couple together and communicate reliably between each other on a monolithic integrated circuit chip. That is, the one or more circuits 802 may be synthesized to include substantially similar reliability features to compliment that of another circuit or functional block in the integrated circuit so that data signals may be communicated reliably between each.

Figure 9:
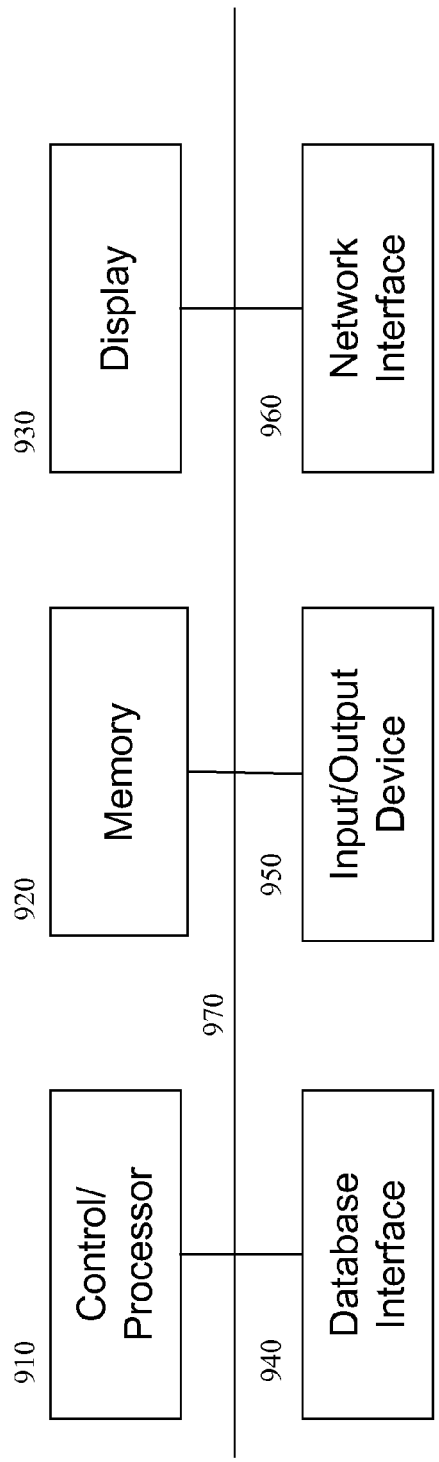
FIG. 9 illustrates a configuration of a computer system that may be used to execute the embodiments of the invention.

FIG. 9 illustrates a possible configuration of a computer system 900 to execute the embodiments of the invention. The computer system 900 may include a controller/processor 910, a memory 920, display 930, database interface 940, input/output device interface 950, and network interface 960, connected through bus 970.

The controller/processor 910 may be any programmed processor known to one of skill in the art. However, the decision support method can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The memory 920 may include volatile and nonvolatile data storage, including one or more electrical, magnetic or optical memories such as a RAM, cache, hard drive, CD-ROM drive, tape drive or removable storage disk. The memory may have a cache to speed access to specific data.

The Input/Output interface 950 may be connected to one or more input devices that may include a keyboard, mouse, pen-operated touch screen or monitor, voice-recognition device, or any other device that accepts input. The Input/Output interface 950 may also be connected to one or more output devices, such as a monitor, printer, disk drive, speakers, or any other device provided to output data.

The network interface 960 may be connected to a communication device, modem, network interface card, a transceiver, or any other device capable of transmitting and receiving signals over a network. The components of the computer system 900 may be connected via an electrical bus 970, for example, or linked wirelessly.

Client software and databases may be accessed by the controller/processor 910 from memory 920 or through the database interface 940, and may include, for example, database applications, word processing applications, the client side of a client/server application such as a billing system, as well as components that embody the decision support functionality of the embodiments of the invention. The database interface may access a database storing both input models and reliability specification files. The computer system 900 may implement any operating system, such as Windows or UNIX, for example. Client and server software may be written in any programming language, such as ABAP, C, C++, Java or Visual Basic, for example.

Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments of the invention may also be practiced in distributed computing environments where tasks are performed by local and remote processing devices that are linked (either by hardwired links, wireless links, or by a combination thereof) through a communications network.

Embodiments of the invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. It does not necessarily need to be one system used by all end users.

What is claimed is:

1. A method of synthesizing a circuit design comprising:
    receiving a high level description of a circuit design into an electronic design automation system;
    receiving a user specification into the electronic design automation system, the user specification selecting a reliability circuit feature to add to the circuit design;
    adding the reliability circuit feature to the high level description of the circuit design based upon the user specification to generate a modified high level description of the circuit design; and producing a netlist of the circuit design with the reliability circuit feature in response to the modified high level description of the circuit design.

2. The method of claim 1, wherein
the high level description is code of a hardware description language describing the circuit design;
the user specification is a data file; and
the netlist maps and interconnects circuit cells of the circuit design to perform the function of the circuit design and the function of the added reliability circuit feature.

3. The method of claim 1, further comprising:
identifying a list of elements of the circuit design;
presenting the list of elements of the circuit design to a user; and
receiving a user selection of the reliability circuit feature in response to the list of elements of the circuit design.

4. The method of claim 3, wherein
the list of elements of the circuit design include one or more of storage elements, computing elements and communication elements.

5. The method of claim 1, wherein
the user specification specifies the automatic application of a parity reliability circuit feature for at least one design element of the initial circuit design.

6. The method of claim 1, wherein
the user specification specifies the automatic application of an error correction code reliability circuit feature for at least one design element of the initial circuit design.

7. The method of claim 1, further comprising:
adding detection logic to the initial circuit design to detect an illegal state and reset a state machine.

8. The method of claim 7, wherein
the detection logic detects at least a single bit error.

9. The method of claim 1, further comprising:
determining from a user specification that the added reliability circuit feature include at least one output pin for coupling to another integrated circuit.

10. The method of claim 1, wherein
the circuit design includes a fault isolation register,
the user specification specifies that the added reliability circuit feature include at least one output to couple to the fault isolation register, and
the at least one output indicates fault or no-fault in an element of the circuit design.

11. The method of claim 2, wherein
the modified input model is a modified high level description of the initial circuit design modified with the reliability circuit feature, and
the producing of the output model includes
receiving the modified high level description,
mapping circuit cells of a cell library in a technology file into the netlist in response to the modified high level description, and
storing the netlist into an integrated circuit design database.

12. An electronic design automation system to synthesize a circuit design, comprising:
a processor to execute instructions;
a non-transitory processor readable medium including instructions stored therein for execution by the processor, including
instructions to provide an input interface to receive a high level description of the circuit design and a user specification selecting a reliability circuit feature to add to the circuit design;
instructions to add the reliability circuit feature to the high level description of the circuit design based upon the user specification; and
instructions to provide an output interface to present a netlist of the circuit design with the reliability circuit feature.

13. The electronic design automation system of claim 12, wherein:
the user specification is a data file; and
the netlist maps and interconnects circuit cells to perform the function of the circuit design and the function of the added reliability circuit feature.

14. The electronic design automation system of claim 12, further comprising:
a display to present a list of identified design elements to a user to assist in selecting the reliability circuit feature.

15. The electronic design automation system of claim 12, wherein:
the circuit design includes a fault isolation register,
the user specification specifies that the added reliability circuit feature include at least one output to couple to the fault isolation register, and
the at least one output indicates fault or no-fault in an element of the circuit design.

16. A non-transitory computer readable medium storing a set of program instructions that, when executed by a processor, cause the processor to perform the operations of:
receiving a high level description of a circuit design into an electronic design automation system;
receiving a user specification into the electronic design automation system, the user specification selecting a reliability circuit feature to add to the circuit design;
adding the reliability circuit feature to the high level description of the circuit design based upon the user specification; and
producing a netlist of the circuit design with the reliability circuit feature.

17. The non-transitory computer readable medium of claim 16, wherein
the user specification specifies the automatic application of a parity reliability circuit feature for at least one design element of the initial circuit design.

18. The non-transitory computer readable medium of claim 16, wherein
the user specification specifies the automatic application of an error correction code reliability circuit feature for at least one design element of the initial circuit design.

19. The non-transitory computer readable medium of claim 16, wherein
the set of program instructions, when executed by the processor, cause the processor to further perform the operations of
adding detection logic to the initial circuit design to detect an illegal state and reset a state machine.

20. The non-transitory computer readable medium of claim 16, wherein
the non-transitory computer readable medium is a computer readable storage media.

21. The non-transitory computer readable medium of claim 16, wherein
the circuit design includes a fault isolation register, and
the user specification specifies that the added reliability circuit feature include at least one output to couple to the fault isolation register.

22. The non-transitory computer readable medium of claim 21, wherein the at least one output indicates fault or no-fault in an element of the circuit design.

23. An integrated circuit comprising:
on a monolithic substrate,
a first synthesized circuit synthesized by a design system with a first added reliability circuit, the first added reliability circuit to detect and correct a circuit fault in the first synthesized circuit;
a first output trace coupled to the first added reliability circuit, the first output trace 804 to indicate fault or no-fault in the first synthesized circuit; and
a fault isolation register coupled to the first output trace, the fault isolation register 806 to register a circuit fault in the first synthesized circuit to enable selection of one or more redundant circuits to continue to process data.

24. The integrated circuit of claim 23, wherein
the first synthesized circuit is a state machine and the first added reliability circuit is an error detection circuit to detect one or more bit errors in the states of the state machine and reset the one or more bit errors to reset the state of the state machine.

25. The integrated circuit of claim 23, wherein
the first synthesized circuit is a state machine and the first added reliability circuit is an illegal state detection circuit to detect an illegal state of the state machine and reset the state machine.

26. An integrated circuit comprising:
on a monolithic substrate,
a first circuit synthesized by a design system with a first added reliability circuit, the first added reliability circuit to detect a fault in the first circuit;
a first output trace coupled to the first added reliability circuit, the first output trace to indicate fault or no-fault in the first circuit;
a second circuit synthesized by a design system with a second added reliability circuit, the second added reliability circuit to detect a fault in the second circuit;
a second output trace coupled to the second added reliability circuit, the second output trace to indicate fault or no-fault in the second circuit; and
a fault isolation register coupled to the first output trace and the second output trace, the fault isolation register to register a fault in one or both of the first circuit and the second circuit.

27. The integrated circuit of claim 26, wherein
the second circuit is a redundant circuit for the first circuit, and
the fault isolation register to enable
between the first circuit and the second circuit in response to a detection of a fault in the second circuit or the first circuit, respectively, so that the integrated circuit may continue to process data.

28. The integrated circuit of claim 26, wherein
the first added reliability circuit is an error correction encoder circuit to generate encoded data for transmission to the second circuit, and
the second added reliability circuit is an error correction decoder circuit to detect and correct a fault in the received encoded data.

* * * * *